March 19, 1940.  N. RINEHART  2,194,125
ARTICLE HANDLING DEVICE
Filed Nov. 30, 1938
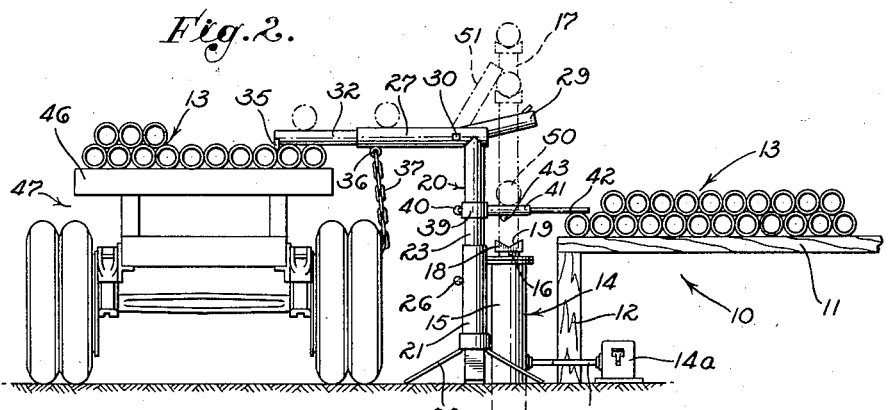
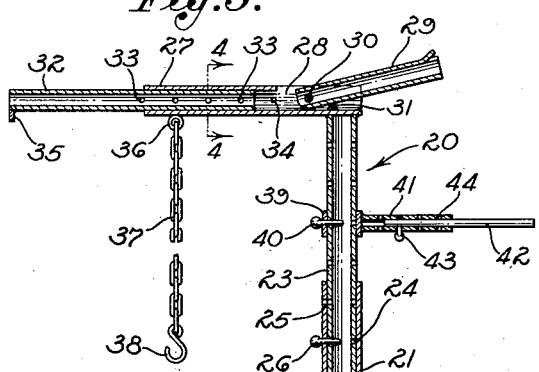
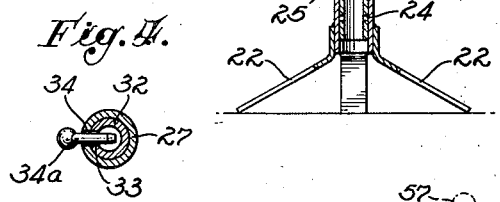
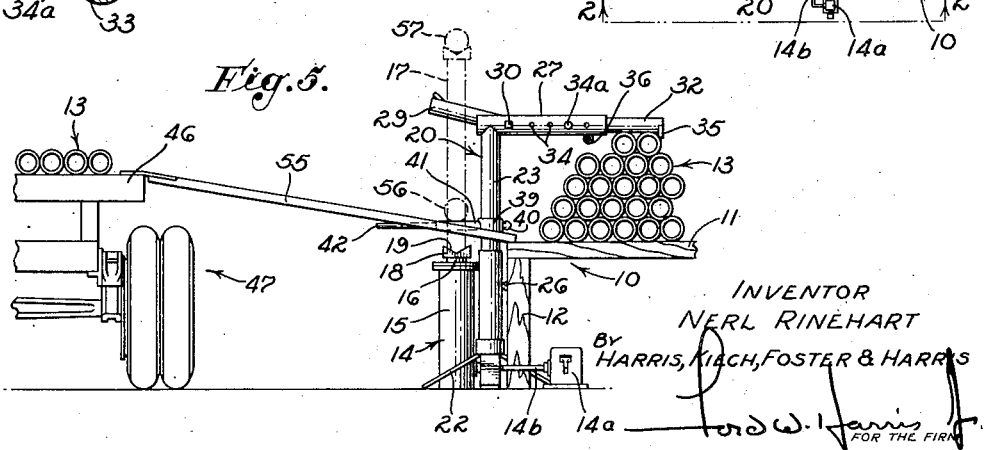
INVENTOR
NERL RINEHART
BY HARRIS, KIECH, FOSTER & HARRIS
ATTORNEYS.

Patented Mar. 19, 1940

2,194,125

UNITED STATES PATENT OFFICE 2,194,125

ARTICLE HANDLING DEVICE

Nerl Rinehart, Bakersfield, Calif., assignor to Western Oil Fields Supply Company, Bakersfield, Calif., a corporation of California Application November 30, 1938, Serial No. 243,142

18 Claims. (Cl. 214—95)

My invention relates to the material-handling art, and more particularly to a device for moving pipe or other heavy elongated articles from one level to another with a minimum of physical labor. The invention is of particular utility in the pipe industry and will be described in connection therewith, although it will be evident to those skilled in the art that the invention may be used to handle steel rails, rods, tubing, wooden logs, and other articles having a long and relatively thin form, without departing from the spirit of the invention.

In the pipe industry, pipe is ordinarily stacked on pipe racks, the platform of which is usually placed at a level at which it is convenient for men to load the pipe on or off the platform. Pipe is ordinarily transported to and from the racks on a truck or other vehicle having a pipe-bed positioned at a materially different level, usually higher, than the level of the platform of the pipe rack. Large or medium sized pipe in standard lengths loaded from such a vehicle to the pipe rack, or vice versa, usually requires at least four men to transfer each section of pipe, due to the great weight of metal pipe. The men, to accomplish such a loading or unloading operation, must stand between the vehicle and the pipe rack, which is exceedingly dangerous. Casualties among such workmen are frequent and serious, due to the weight and awkward shape of the pipe.

It is therefore a primary object of my invention to obviate the use of most of the manual labor now required in loading pipe from a pipe rack to a vehicle bed, and vice versa.

It is a further object of my invention to provide mechanism for loading or unloading pipe in the use of which the operator or operators will not be required to stand in the danger zone beneath the pipe as it is being loaded or unloaded.

Another object of my invention is to provide a device for loading and unloading pipe which may be readily adapted for either purpose and which will be simple and cheap to construct and operate.

Other objects and advantages of my invention will be more fully described in connection with the preferred embodiment of my invention, as described hereinafter.

In the drawing, which is for the purpose of illustration only:

Fig. 1 is a plan view of the invention in use with a pipe rack having a truck in loading position relation thereto.

Fig. 2 is an end elevational view taken on the line 2—2 of Fig. 1.

Fig. 3 is an enlarged sectional view of the handling mechanism of the invention.

Fig. 4 is an enlarged cross-sectional view taken on the line 4—4 of Fig. 3.

Fig. 5 is an end elevational view of my invention in unloading position.

Referring to the drawing, I show a pipe rack 10 formed of horizontal members 11 supported on uprights 12. A plurality of pipe sections 13 are normaly stacked transversely on the horizontal members 11. This type of pipe rack and general method of stacking are well known in the art.

Positioned adjacent the inner end of the horizontal members 11, and preferably midway between the ends of the pipe rack 10, is a lifting mechanism 14 which may be of the pneumatic or hydraulic jack type well known in the art, having an outer housing 15 which may be set into the earth or otherwise supported, out of which projects a movable plunger 16 which is adapted to be moved from the position shown in full lines to the position 17 shown in dotted lines in Fig. 2, by any suitable mechanism contained in the housing 15, as is well known in the art. Rigidly fixed to the top of the plunger 16 and supported thereby is a horizontal trough member 18 which has a V-shaped trough 19 formed in the upper surface thereof. The operation of the lifting mechanism 14 may be controlled by any suitable mechanism, but I prefer to incorporate the controls therefor in a control box 14a operatively connected to the lifting mechanism by a conduit 14b, and, as will be noted, the control box is preferably located at one end of the pipe rack 10 so that the operator of the lifting mechanism will not be required to stand in the danger zone between the pipe rack and the vehicle to be described hereinafter.

Also adapted to be positioned adjacent the pipe rack 10 are two handling mechanisms 20 of identical construction, one such handling mechanism being shown in detail in Fig. 3. The handling mechanism 20 has an outer tubular member 21 which is preferably supported by legs 22 rigidly secured thereto as by welding or otherwise, which construction renders the handling mechanism fully portable so that it may be moved from place to place as desired. It will be understood, however, that any suitable type of support may be substituted for the legs 22 without departing from the spirit of the invention. Telescoping into the outer tubular member 21 is an inner tubular member 23, having holes 24 therein adapted to be registered with openings 25 in the outer tubular member 21 so that a pin 26 may be inserted therethrough so as to hold the inner tubular member in fixed vertical position relative to the outer tubular member. In this construction it will be understood that the inner tubular member 23 may be telescoped upwardly or downwardly into or out of the outer tubular member 21 to be fixed in any one of a plurality of positions relative thereto so that the inner tubular member may be adjusted to any desired height within the limits of the device. Fixed to the upper end of the inner tubular member 23, as by welding or otherwise, is a horizontally projecting tubular arm 27 having its inner upper surface slotted at 28, in which portion is carried an article catcher 29 pivoted to the tubular arm 27 by a suitable bolt 30 passing through both members. The article catcher 29 constitutes the catcher means of the invention. Between the bolt 30 and the inner tubular member 23 is positioned a raised knob 31 rigidly secured to or formed on the tubular arm 27 by welding or otherwise, and on which the article catcher 29 is adapted to rest when in lowered position as shown in Fig. 3, in which position the article catcher is inclined upwardly at a slight angle from the horizontal. Telescoping into the outer end of the tubular arm 27 is an outer arm 32 having holes 33 therein adapted to register with openings 34 formed in the tubular arm 27, through which a suitable pin 34a is adapted to be inserted, as shown in Fig. 4, to hold the tubular arm 27 and the outer arm 32 in fixed relative position. By this construction it will be understood that the outer arm 32 may be telescoped into or out of the tubular arm 27 to any desired position relative thereto within the limits of the construction. Fixed to the lower outer end of the outer arm 32 is a depending dog member 35 which serves as a grappling hook as described hereinafter. Also secured to the tubular arm 27 is an eye 36 having a chain 37 connected thereto, to the lower end of which is connected a hook member 38.

Carried on the inner tubular member 23 is a collar 39 slidable thereon and secured thereto by means of a pin 40 passing through a suitable opening in the collar and adapted to be inserted into one of the holes 24 in the inner tubular member 23. Fixed to or formed integrally on the collar 39 is a tubular sleeve 41 into which telescopes a projecting rod 42 longitudinally secured to the tubular sleeve by means of a suitable pin 43 which may be inserted through holes 44 in the sleeve to engage the rod to hold it in fixed longitudinal position relative to the sleeve, as described above in connection with the other telescoping members of the handling mechanism 20.

As shown in Fig. 1, I prefer to use two of the handling mechanisms 20, one placed adjacent each end of the pipe rack 10, although it will be understood that additional handling mechanisms may be added as required. As shown in Figs. 1 and 2, the pipe handling mechanisms 20 are positioned for loading the pipe sections 13 from the pipe rack 10 onto a bed 46 of a suitable truck 47, or any other vehicle suitable for transporting pipe sections or other articles being handled. As will be noted, the truck 47 is moved to a position adjacent the pipe rack 10, the handling mechanisms 20 being positioned in a plane adjacent the plane of the trough member 18 but between the lifting mechanism 14 and the truck 47. For the loading operation, the inner tubular members 23 of the handling mechanisms 20 are raised to a desired position in which the outer arms 32 rest at a level at which pipe can be rolled or otherwise moved off the arms 32 of the handling mechanisms 20 onto the bed 46 of the truck 47. The dog members 35 on the outer ends of the inner arms 32 serve as grapples to hook onto the bed 46, or pipe sections 13 stacked thereon, to steady the position of the handling mechanisms 20. Likewise, the hooks 38 on the chains 37 may be hooked to some convenient extension on the truck 47 so as to further steady the position of the handling mechanisms 20. In this position of the handling mechanisms 20 it will be noted that the article catchers 29 thereof are normally disposed in the vertical line of the movable plunger 16 and trough member 18 carried thereby. It will also be noted that the collars 39 are adjusted to a height on the inner tubular members 23 such that the projecting rods 42 may be rested over the edge of the pipe rack 10 in a position in which pipe sections 13 may be rolled or otherwise moved from the rack 10 onto the arms 42 to a position in which each pipe section is vertically aligned with the trough 19.

When it is desired to perform a loading operation by moving the pipe sections 13 from the pipe rack 10 to the bed 46 of the truck 47, one man may roll or otherwise move a pipe section 13 over the rods 42 and onto the sleeves 41 to the position shown in dotted lines 50 in Fig. 2, in which the pipe section is vertically aligned with the trough 19. Adjustment of the controls on the control box 14a then causes the lifting mechanism to raise the movable plunger 16 to raise the trough member 18 upwardly until the trough member engages the pipe section 13 in the position 50, further upward movement of the plunger causing the pipe section to be supported in the trough 19 and to move upwardly with the trough member. Continued upward movement of the plunger 16 causes the pipe section to engage the article catchers 29 to move them upwardly against the action of gravity and out of the path of the pipe, as shown by dotted lines 51 in Fig. 2. As soon as the trough member 18 has moved upwardly to a point at which the pipe section supported in the trough 19 is above the article catchers 29, the article catchers will automatically drop back to the position shown in full lines in Fig. 2, by the action of gravity. By suitable actuation of the controls of the control box 14a, the movable plunger 16 and the trough 18 connected thereto are then moved downwardly to the position shown in full lines in Fig. 2. As will be readily understood, however, when the pipe section on the trough 18 engages the article catchers 29 on the downward movement of the trough member 18, the trough member then moves away from the pipe, and the pipe section rolls, or is moved, down the article catchers, along the tubular arms 27 and the outer arms 32 onto the truck 47 into loaded position.

The operation of loading the pipe sections 13 from the rack 10 to the bed 46 of the truck 47 can thus be accomplished with a minimum of manual labor and complete safety to the operators due to the fact that the operators are not required to stand between the pipe rack and the truck during the loading operation.

In the unloading operation, the unloading position being diagrammatically illustrated in Fig. 5, rods 55 are normally positioned so as to be supported at one end on the bed 46 of the truck 47 and at the other end on the pipe rack 10 over which the pipe sections 13 may be rolled or otherwise moved downwardly onto the pipe rack. It frequently occurs, however, that the pipe rack 10 may be partially filled with pipe sections 13 to a level above the level of the bed 46 of the truck 47 so that any pipe moved from the bed 46 to the pipe rack 10 must ultimately be raised for stacking. My invention is peculiarly adapted to perform the unloading operation under such circumstances, in which the handling mechanisms 20 are positioned between the plane of the lifting mechanism 14 and the pipe rack 10, being reversed in position from the position shown in Fig. 2, as fully shown in Fig. 5. In this position, the pipe handling mechanisms 20 are adjusted so that the outer arms 32 rest on top of the stack of pipe sections 13 on the pipe rack 10, and the sleeves 41 and projecting rods 42 extend below the level of the rods 55. The pipe sections 13 resting on the bed 46 of the truck 47 are then consecutively rolled or otherwise moved down the rods 55 to the position 56 shown in dotted lines in which the pipe section rests on the sleeves 41 in vertical alignment with the trough 19, and the lifting mechanism 14 is suitably actuated to raise the movable plunger 16 and the trough member 18 upwardly to engage and raise the pipe, as hereinbefore described, to the position 57 shown in dotted lines, following which the movable plunger is lowered so that the pipe section on the trough member 18 is caught by the article catchers 29 and may be rolled or otherwise moved therefrom over the tubular arms 27 and the outer arms 32 onto the top of the stack of pipe sections 13 on the rack 10.

From the foregoing explanation it will be apparent that my invention is adapted to both load and unload pipe or other similar articles from one level to another with a minimum of manual labor and a maximum of safety for the operators engaged in the operations. It is to be further noted that by the adjustable features of the handling mechanisms 20, they may be readily adjusted to meet any conditions in normal service, and that by supporting the handling mechanisms by the legs 22 they are made fully portable so that they may be readily moved from place to place to perform either the loading or unloading operations described hereinabove.

Although I have described my invention in simple and practical form, it will be understood that the form of the construction shown may be changed without departing from the spirit of the invention, and that I do not intend to be limited by the specific construction shown but intend to have the benefits of all equivalents thereof covered by the full scope of the following claims.

I claim as my invention:

1. In a device of the character described, the combination of: a first platform at one level; a second platform at a higher level; lifting mechanism positioned between said platforms and adapted to raise an elongated article from said lower level to a point higher than said higher level; means for conveying said article from said first platform to said lifting mechanism; handling means for conveying said article from said lifting mechanism to said second platform, said handling means being disposed between said lifting mechanism and said second platform, said handling means including arm members extending from said handling means onto said second platform and catcher means pivoted relative to said arm members and in normal position extending into the line of travel of said lifting mechanism, said catcher means being adapted to be raised during the upward movement of said article to permit the passage of said article to a position above said catcher means, said catcher means returning to said normal position when said article is passed thereabove, said catcher means being constructed and arranged so that it will stop the downward passage of said article thereby when said lifting mechanism is lowered and convey said article therefrom over said arms to said second platform; and means for operating said lifting mechanism to move said article upwardly and downwardly thereon as desired.

2. In a device of the character described, the combination of: a first platform at one level; a second platform at a higher level; lifting mechanism positioned between said platforms and adapted to raise an elongated article from said lower level to a point higher than said higher level; means for conveying said article from said first platform to said lifting mechanism; handling means for conveying said article from said lifting mechanism to said second platform, said handling means being disposed between said lifting mechanism and said second platform, said handling means including arm members extending from said handling means onto said second platform and catcher means pivoted relative to said arm members and in normal position extending into the line of travel of said lifting mechanism, said catcher means being adapted to be moved out of the path of said article during the upward movement of said article to permit the passage of said article to a position above said catcher means, said catcher means returning to said normal position when said article is passed thereabove, said catcher means being constructed and arranged so that it will stop the downward passage of said article thereby when said lifting mechanism is lowered and convey said article therefrom over said arms to said second platform; and means for operating said lifting mechanism to move said article upwardly and downwardly thereon as desired.

3. In a device of the character described, the combination of: a platform at one level; lifting mechanism adapted to raise an elongated article from another level to said one level; handling means for conveying said article from said lifting mechanism to said platform, said handling means including arm members extending from said handling means onto said platform and catcher means movable relative to said arm members and in normal position extending into the line of travel of said lifting mechanism and said article, said catcher means being adapted to be moved out of the path of said article during upward movement of said article to permit the passage of said article to a position above said catcher means, said catcher means returning to said normal position when said article is passed thereabove, said catcher means being constructed and arranged so that it will stop the downward passage of said article thereby when said lifting mechanism is lowered and convey said article therefrom over said arms to said platform; and means for operating said lifting mechanism to move said article upwardly and downwardly thereon as desired.

4. In a device of the character described, the combination of: a platform at one level; lifting mechanism adapted to raise an elongated article from another level to said one level; handling means for conveying said article from said lifting mechanism to said platform, said handling means including arm members extending from said handling means onto said platform and catcher means movable relative to said arm members and in normal position extending into the line of travel of said lifting mechanism and said article, said catcher means being adapted to be moved out of the path of said article during upward movement of said article to permit the passage of said article to a position above said catcher means, said catcher means returning to said normal position when said article is passed thereabove, said catcher means being constructed and arranged so that it will stop the downward passage of said article thereby when said lifting mechanism is lowered and convey said article therefrom over said arms to said platform, said handling means also including means for holding said arms substantially rigid relative to said platform; and means for operating said lifting mechanism to move said article upwardly and downwardly thereon as desired.

5. In a device of the character described, the combination of: a platform at one level; lifting mechanism adapted to raise an elongated article from another level to said one level; handling means for conveying said article from said lifting mechanism to said platform, said handling means including arm members extending from said handling means onto said platform and catcher means movable relative to said arm members and in normal position extending into the line of travel of said lifting mechanism and said article, said catcher means being adapted to be moved out of the path of said article during upward movement of said article to permit the passage of said article to a position above said catcher means, said catcher means returning to said normal position when said article is passed thereabove, said catcher means being constructed and arranged so that it will stop the downward passage of said article thereby when said lifting mechanism is lowered and convey said article therefrom over said arms to said platform, said handling means being constructed and arranged so that it is readily portable; and means for operating said lifting mechanism to move said article upwardly and downwardly thereon as desired.

6. In a device of the character described, the combination of: a platform at one level; lifting mechanism adapted to raise an elongated article from another level to said one level; handling means for conveying said article from said lifting mechanism to said platform, said handling means including arm members extending from said handling means onto said platform and catcher means movable relative to said arm members and in normal position extending into the line of travel of said lifting mechanism and said article, said catcher means being adapted to be moved out of the path of said article during upward movement of said article to permit the passage of said article to a position above said catcher means, said catcher means returning to said normal position when said article is passed thereabove, said catcher means being constructed and arranged so that it will stop the downward passage of said article thereby when said lifting mechanism is lowered and convey said article therefrom over said arms to said platform, said handling means being constructed and arranged so that the height of said arms is readily adjustable; and means for operating said lifting mechanism to move said article upwardly and downwardly thereon as desired.

7. In a device of the character described, the combination of: a platform at one level; lifting mechanism adapted to raise an elongated article from another level to said one level; handling means for conveying said article from said lifting mechanism to said platform, said handling means including arm members extending from said handling means onto said platform and catcher means movable relative to said arm members and in normal position extending into the line of travel of said lifting mechanism and said article, said catcher means being adapted to be moved out of the path of said article during upward movement of said article to permit the passage of said article to a position above said catcher means, said catcher means returning to said normal position when said article is passed thereabove, said catcher means being constructed and arranged so that it will stop the downward passage of said article thereby when said lifting mechanism is lowered and convey said article therefrom over said arms to said platform, said handling means also including a vertically adjustable, horizontally projecting member adapted to receive said article to be raised by said lifting mechanism; and means for operating said lifting mechanism to move said article upwardly and downwardly thereon as desired.

8. In a device for handling elongated articles, the combination of: an arm member disposed substantially horizontally; means for supporting said arm member, the height of said means being adjustable; a catcher member horizontally pivoted at one end to said arm member; and means for limiting the downward movement of said catcher member about said pivot to a lowermost position in which it normally projects from said arm member at a slight inclination from the horizontal sufficient to cause articles received by the upper side of said catcher member to move by gravity over and beyond said catcher member, said catcher member being adapted to be rotated upwardly about said pivot by an elongated article raised thereagainst, said catcher member automatically returning to said normally projecting position after said elongated article has passed out of engagement with said catcher member.

9. In a device for handling elongated articles, the combination of: a body member; an arm member supported by said body member in a substantially horizontal position; a catcher member horizontally pivoted relative to said arm member; and means for limiting the downward movement of said catcher member about said pivot to a lowermost normal position in which said catcher member projects upwardly relative to said arm member at a slight inclination from the horizontal sufficient to cause articles received by the upper side of said catcher member to move by gravity over said catcher member.

10. In a device for handling elongated articles, the combination of: a body member, the height thereof being readily adjustable; an arm member supported by said body member in a substantially horizontal position; a catcher member horizontally pivoted relative to said arm member; and means for limiting the downward movement of said catcher member about said pivot to a lowermost normal position in which said catcher member projects upwardly relative to said arm member at a slight inclination from the horizontal sufficient to cause articles received by the upper side of said catcher member to move by gravity over said catcher member.

11. In a device for handling elongated articles, the combination of: a body member; an arm member supported by said body member in a substantially horizontal position, the length of said arm member being readily adjustable; a catcher member horizontally pivoted relative to said arm member; and means for limiting the downward movement of said catcher member about said pivot to a lowermost normal position in which said catcher member projects upwardly relative to said arm member at a slight inclination from the horizontal sufficient to cause articles received by the upper side of said catcher member to move by gravity over said catcher member.

12. In a device for handling elongated articles, the combination of: a body member, the height thereof being readily adjustable; an arm member supported by said body member in a substantially horizontal position, the length of said arm member being readily adjustable; a catcher member horizontally pivoted relative to said arm member; and means for limiting the downward movement of said catcher member about said pivot to a lowermost normal position in which said catcher member projects upwardly relative to said arm member at a slight inclination from the horizontal sufficient to cause articles received by the upper side of said catcher member to move by gravity over said catcher member.

13. In a device for handling elongated articles, the combination of: a body member; an arm member supported by said body member in a substantially horizontal position; securing means associated with said arm member and adapted to secure said arm member in a substantially rigid position; a catcher member horizontally pivoted relative to said arm member; and means for limiting the downward movement of said catcher member about said pivot to a lowermost normal position in which said catcher member projects upwardly relative to said arm member at a slight inclination from the horizontal sufficient to cause articles received by the upper side of said catcher member to move by gravity over said catcher member.

14. In a device for handling elongated articles, the combination of: a body member; an arm member supported by said body member in a substantially horizontal position; a catcher member horizontally pivoted relative to said arm member; means for limiting the downward movement of said catcher member about said pivot to a lowermost normal position in which said catcher member projects upwardly relative to said arm member at a slight inclination from the horizontal sufficient to cause articles received by the upper side of said catcher member to move by gravity over said catcher member; and a transverse arm secured to said body member below said catcher member and in substantially the same vertical plane therewith.

15. In a device for handling elongated articles, the combination of: a body member; an arm member supported by said body member in a substantially horizontal position; a catcher member horizontally pivoted relative to said arm member; means for limiting the downward movement of said catcher member about said pivot to a lowermost normal position in which said catcher member projects upwardly relative to said arm member at a slight inclination from the horizontal sufficient to cause articles received by the upper side of said catcher member to move by gravity over said catcher member; and a transverse arm secured to said body member below said catcher member and in substantially the same vertical plane therewith, the length of said transverse arm being adjustable 16. A portable handling device for elongated articles comprising: a standard; a horizontal cantilever arm projecting in one direction from said standard at an upper level; a pivoted cantilever arm projecting from said standard in the opposite direction at said level; and means on said device for supporting said pivoted arm in a lowermost normal position at a slight upward inclination from said pivot.

17. In a device for handling elongated articles, the combination of: a vertically reciprocable lifting jack; an article cradle carried by said jack; a pair of horizontal supports on opposite sides of said jack and in the vertical plane of said cradle for supporting elongated articles at a lower level; and a pair of movably mounted arms disposed on opposite sides of said jack and in the vertical plane of said supports, each of said arms being normally held in a first position to support said articles and movable from said first position by engagement with an upwardly moving article to a second position of disengagement, said arms being automatically returnable upon disengagement to said first position.

18. In a device for handling elongated articles, the combination of: a vertically reciprocable lifting jack; an article cradle carried by said jack; a pair of horizontal supports on opposite sides of said jack and in the vertical plane of said cradle for supporting elongated articles at a lower level; and a pair of movably mounted arms disposed on opposite sides of said jack and in the vertical plane of said supports, each of said arms being normally held in a first position to support said articles and movable from said first position by engagement with an upwardly moving article to a second position of disengagement, said arms being automatically returnable upon disengagement to said first position, said first position being at a sufficient inclination to the horizontal to cause an article supported by said pair of arms to move therefrom by gravity.

NERL RINEHART.